(12) United States Patent
Liu

(10) Patent No.: US 10,176,134 B2
(45) Date of Patent: Jan. 8, 2019

(54) PORTABLE DEVICE AND METHOD OF CONTROLLING HDMI SIGNAL OUTPUT THEREIN

(71) Applicant: Beijing Pico Technology Co., Ltd., Hai Dian District (CN)

(72) Inventor: Guanghui Liu, Hai Dian District (CN)

(73) Assignee: Beijing Pico Technology Co., Ltd., Hai Dian District (CN)

( * ) Notice: Subject to any disclaimer, the term of this patent is extended or adjusted under 35 U.S.C. 154(b) by 220 days.

(21) Appl. No.: 15/232,726

(22) Filed: Aug. 9, 2016

(65) Prior Publication Data
US 2017/0192923 A1    Jul. 6, 2017

(30) Foreign Application Priority Data

Dec. 31, 2015  (CN) .......................... 2015 1 1032405

(51) Int. Cl.
| G06F 13/38 | (2006.01) |
| G06F 13/40 | (2006.01) |
| G06F 13/42 | (2006.01) |

(52) U.S. Cl.
CPC ........ *G06F 13/385* (2013.01); *G06F 13/4022* (2013.01); *G06F 13/4282* (2013.01)

(58) Field of Classification Search
CPC . G06F 13/385; G06F 13/4022; G06F 13/4282
See application file for complete search history.

(56) References Cited

U.S. PATENT DOCUMENTS

2016/0253282 A1* 9/2016 Bowers ............... G06F 13/4022
                                                            710/316
2017/0017595 A1* 1/2017 Schnell ................. G06F 13/385

* cited by examiner

*Primary Examiner* — Tim T Vo
*Assistant Examiner* — Herve Iradukunda
(74) *Attorney, Agent, or Firm* — LKGlobal | Lorenz & Kopf, LLP

(57) ABSTRACT

The present invention discloses a portable device and a method of controlling HDMI signal output therein. The portable device comprises: a microcontroller unit, a USB Type-C interface, and a plurality of analog switches. Each of the analog switches is arranged between a HDMI signal output pin of the microcontroller unit and a corresponding pin of the USB Type-C interface. The microcontroller unit is configured to detect a positive or reverse insertion direction of the USB Type-C interface, and output a corresponding control signal to the analog switch according to the difference of the insertion direction. The analog switch is configured to shift a switching direction according to the control signal so that the HDMI signal is output through a corresponding pin of the USB Type-C interface.

8 Claims, 3 Drawing Sheets

| Pin 1 | TMDS Data2+ | Pin 11 | TMDS Clock Shield |
| Pin 2 | TMDS Data2 Shield | Pin 12 | TMDS Clock- |
| Pin 3 | TMDS Data2- | Pin 13 | CEC |
| Pin 4 | TMDS Data1+ | Pin 14 | Reserved |
| Pin 5 | TMDS Data1 Shield | Pin 15 | SCL |
| Pin 6 | TMDS Data1- | Pin 16 | SDA |
| Pin 7 | TMDS Data0+ | Pin 17 | DDC/CEC Ground |
| Pin 8 | TMDS Data0 Shield | Pin 18 | +5V Power |
| Pin 9 | TMDS Data0- | Pin 19 | Hot Plug Detect |
| Pin 10 | TMDS Clock+ | | |

FIG. 1

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1- | Vbus | CC1 | D+ | D- | SBU1 | Vbus | RX2- | RX2+ | GND |
| GND | RX1+ | RX1- | Vbus | SBU2 | D- | D+ | CC2 | Vbus | TX2- | TX2+ | GND |
| B12 | B11 | B10 | B9 | B8 | B7 | B6 | B5 | B4 | B3 | B2 | B1 |

FIG. 2

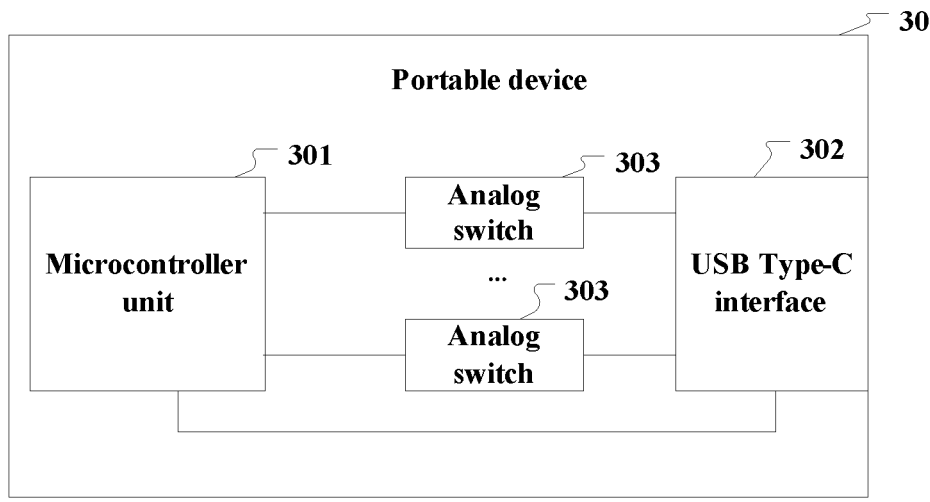

FIG. 3

PORTABLE DEVICE AND METHOD OF CONTROLLING HDMI SIGNAL OUTPUT THEREIN

CROSS-REFERENCE TO RELATED APPLICATIONS

This application claims priority to Chinese Application Number 201511032405.4 filed Dec. 31, 2015, which is incorporated herein by reference in its entirety.

TECHNICAL FIELD

The application pertains to the technical field of mobile terminals, and specifically to a portable device and a method of controlling HDMI signal output therein.

BACKGROUND

A current portable device enabling High Definition Multimedia Interface (HDMI) and Universal Serial Bus (USB) data transmission function is provided with two interfaces: an HDMI interface and a USB interface, and the two kinds of signals are output via their respective transmission channels. That is, a HDMI signal is output through a standard HDMI interface (e.g., HDMI Type-A interface) whereas a USB signal is output through the USB interface (e.g., USB Type-C interface).

FIG. 1 is a signal pin definition schematic diagram of an HDMI Type-A interface. Referring to FIG. 1, the pin of the standard HDMI Type-A interface and an actual use situation are as follows: Pin 14 is a reserved pin and not in use, Pin 17 is directly grounded, so actually available signals are a total of 16 lines including three pairs of differential data (TMDS Data2+/−, TMDS Data1+/−, TMDS Data0+/−), one pair of clock (TMDS Clock+/−), two IIC signals (SCL, SDA), Hot Plug Detection (HPD) and Consumer Electronics Control (CEC) signal, power supply and grounding. A Transition Minimized Differential Signal (TMDS) is a signal transmission link in the HDMI.

FIG. 2 is a signal pin definition schematic diagram of a USB Type-C interface. Referring to FIG. 2, the signal pin of the Type-C interface is used in the following way: on a USB Type-C connector have already been defined four pairs of high-speed signals, TX1+/−, RX1+/−, TX2+/− and RX2+/− respectively, and four low-speed signals CC1, CC2, SBU1 and SBU2, wherein CC1 and CC2 are two key pins and have many functions, e.g., detect connection and distinguish positive and reverse sides, and wherein auxiliary signals SBU1 and SBU2 (Side Band Use) are only used in some specific transmission modes.

As known from the above, in the prior art if a user wants to use the HDMI function and USB function of the portable device simultaneously, he needs to insert corresponding data connection lines respectively, namely, he at least needs to perform the interface insertion operation twice, which causes inconvenience to the user and leads to undesirable user experience.

In addition, other objects, desirable features and characteristics will become apparent from the subsequent summary and detailed description, and the appended claims, taken in conjunction with the accompanying drawings and this background.

SUMMARY

The present invention provides a portable device and a method of controlling HDMI signal output to solve the problem that a current portable device is provided with both an HDMI interface and a USB interface, an interface insertion operation needs to be performed at least twice upon use, and the user's experience is undesirable.

According to an aspect of the present invention, there is provided a portable device, comprising:

a microcontroller unit, a USB Type-C interface, and a plurality of analog switches;

each of the analog switches is arranged between a HDMI signal output pin of the microcontroller unit and a corresponding pin of the USB Type-C interface;

the microcontroller unit is configured to detect a positive or reverse insertion direction of the USB Type-C interface, and output a corresponding control signal to the analog switch according to the difference of the insertion direction;

the analog switch is configured to shift a switching direction according to the control signal so that the HDMI signal is output through a corresponding pin of the USB Type-C interface.

According to another aspect of the present invention, there is provided a method of controlling HDMI signal output in a portable device. The method comprises:

arranging a plurality of analog switches between a HDMI signal output pin of a microcontroller unit of a portable device and a corresponding pin of a USB Type-C interface;

using the microcontroller unit to detect a positive or reverse insertion direction of the USB Type-C interface, and outputting a corresponding control signal to the analog switch according to the difference of the insertion direction;

using the analog switch to shift a switching direction according to the control signal so that the HDMI signal is output through the corresponding pin of the USB Type-C interface.

Advantageous effects of the present invention are as follows: according to technical solutions of embodiments of the present invention, the analog switch is arranged between a HDMI signal output pin and a corresponding pin of the USB Type-C interface, a positive or reverse insertion direction of the USB Type-C interface is detected, and the direction of the analog switch is shifted according to the difference of the insertion direction so that the HDMI signal is output through a corresponding pin of the USB Type-C interface upon positive or reverse insertion. Hence, the present invention has the following merits: 1) partial pins of the USB Type-C interface arranged in the portable device are used to transmit the HDMI signal so that the HDMI signal can be output correctly in the case of the positive insertion or reverse insertion. 2) among pins of the USB Type-C interface, a USB signal transmission channel is reserved to transmit USB data, thereby implementing enabling of HDMI data transmission and USB data transmission. As such, the user only needs to execute the interface insertion operation once so that the user's time is saved and the user's operation is facilitated. 3) only one USB Type-C interface needs to be arranged in the portable device to perform three functions, namely, USB data transmission, quick charging and HDMI audio and video signal transmission. As compared with a device having both the HDMI interface and USB interface in the prior art, the device according to the present invention exhibits a more compact structure, saves overall space of the device and improves market competitive power of the portable device.

In addition, by the method of controlling HDMI signal output in the portable device, the HDMI signal and USB signal are controlled and transmitted through the same USB Type-C interface, thereby improving the user's experience in use and the competitive power of the portable device.

BRIEF DESCRIPTION OF THE DRAWINGS

The present invention will hereinafter be described in conjunction with the following drawing figures, wherein like numerals denote like elements, and:

FIG. 1 is a signal pin definition schematic diagram of an HDMI Type-A interface;

FIG. 2 is a signal pin definition schematic diagram of a USB Type-C interface;

FIG. 3 is a block diagram of a portable device according to an embodiment of the present invention;

DETAILED DESCRIPTION

Figures 4, 5:
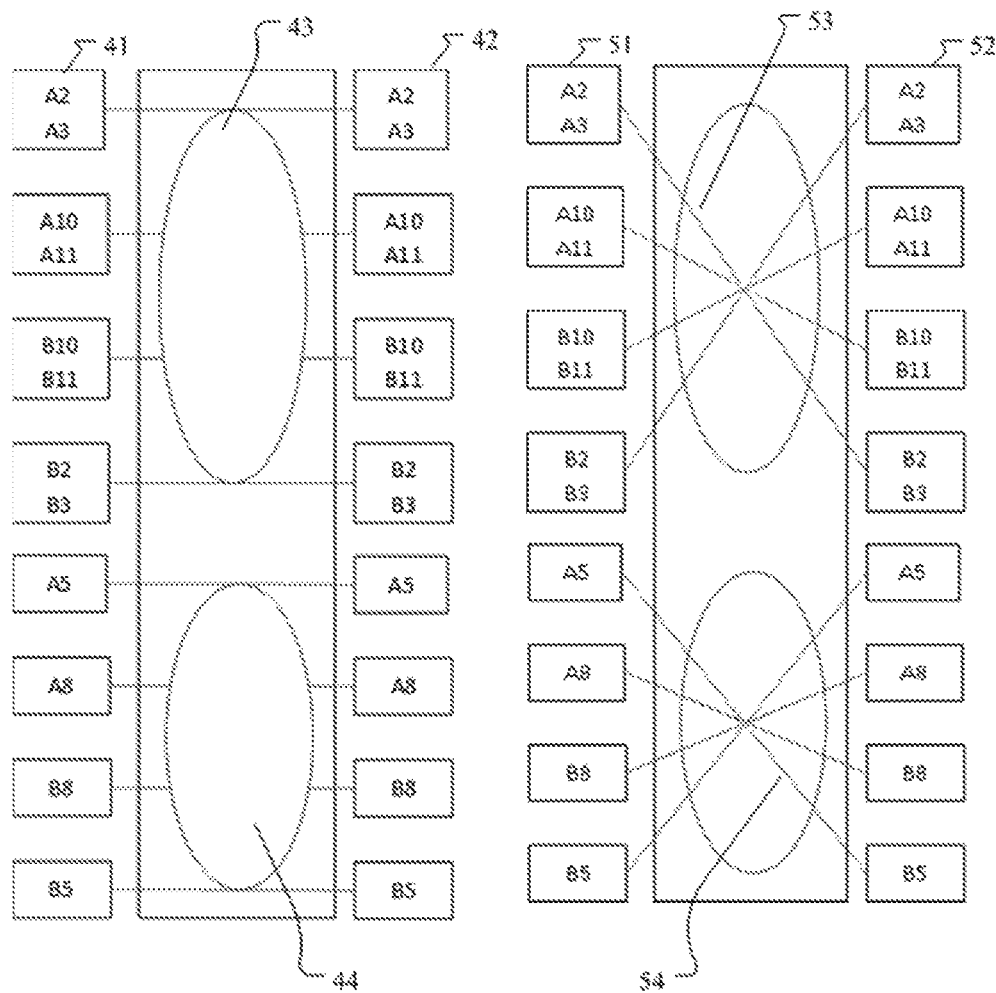
FIG. 4 is a schematic diagram of a switching direction of an analog switch in a circuit in a positive insertion mode according to an embodiment of the present invention.
FIG. 5 is a schematic diagram of a switching direction of an analog switch in a circuit in a reverse insertion mode according to an embodiment of the present invention.

The following detailed description is merely exemplary in nature and is not intended to limit the invention or the application and uses of the invention. Furthermore, there is no intention to be bound by any theory presented in the preceding background of the invention or the following detailed description.

A core idea of the present invention is, based on a structure of a current USB Type-C interface, selecting partial signal pins from its pins to perform the function of transmitting HDMI audio and video signals so as to enable the portable device to only reserve one USB Type-C interface to perform the function of transmitting the HDMI signal and USB signal simultaneously, thereby saving the overall space of the device and facilitating user's operations in a way that one interface can be used to perform two functions.

Embodiment 1

FIG. 3 is a block diagram of a portable device according to an embodiment of the present invention. Referring to FIG. 3, the portable device 30 comprises a microcontroller unit 301, a USB Type-C interface 302, and a plurality of analog switches 303;

Each of the analog switches 303 is arranged between a HDMI signal output pin of the microcontroller unit 301 and a corresponding pin of the USB Type-C interface 302;

The microcontroller unit 301 is configured to detect a positive or reverse insertion direction of the USB Type-C interface 302, and output a corresponding control signal to the analog switch 303 according to the difference of the insertion direction;

The analog switch 303 is configured to shift a switching direction according to the control signal so that the HDMI signal is output through a corresponding pin of the USB Type-C interface 302.

As known from FIG. 3, the portable device according to the present embodiment is only provided with one interface, namely, a USB Type-C interface. The USB Type-C interface is used to transmit the HDMI signal and facilitates the user's operation as compared with the portable device in the prior art. The USB Industry Association previously issued USB3.1 Standard (see FIG. 2) and defined standard specification of the USB Type-C connector. The USB Type-C interface is an I/O interface that may perform data transmission (enabling USB3.0 standard), is connected with an external device, supplies power to the device, and enables positive and reverse insertion.

Embodiment 2

Referring to the following Table 1 and Table 2, the present embodiment is specifically described in conjunction with the HDMI signal line corresponding to the pin of the USB Type-C interface in the portable device in a positive insertion mode and a reverse insertion mode.

TABLE 1

| A1 GND    | B12 GND   |
|-----------|-----------|
| A2 Data2+ | B11 Clock+|
| A3 Data2− | B10 Clock−|
| A4 VBUS   | B9 VBUS   |
| A5 CEC    | B8 SDA    |
| A6 D+     | B7 D−     |
| A7 D−     | B6 D+     |
| A8 SCL    | B5 HPD    |
| A9 VBUS   | B4 VBUS   |
| A10 Data0−| B3 Data1− |
| A11 Data0+| B2 Data1+ |
| A12 GND   | B1 GND    |

Table 1 illustrates a pin definition in the USB Type-C interface in the positive insertion mode according to an embodiment of the present invention. As shown in Table 1, in the positive insertion mode of the USB Type-C interface, uplink pins of the USB Type-C interface comprises: A1 pin being grounded (GND), A2 pin connected with a Data2+ signal line of the HDMI, A3 pin connected with a Data2− signal line of the HDMI, A4 pin connected with a power supply VBUS, A5 pin connected with a CEC signal line in the HDMI signal, A6 pin connected with a D+ signal line in the USB signal, A7 pin connected with a D− signal line in the USB signal, A8 pin connected with a SCL signal line in the HDMI signal, A9 pin connected with the power supply VBUS, A10 pin connected with a Data0− signal line in the HDMI signal, A11 pin connected with a Data0+ signal line in the HDMI signal, and A12 pin being grounded (GND); downlink pins of the USB Type-C interface comprises: B12 pin being grounded (GND), B11 pin connected with a Clock+ signal line in the HDMI signal, B10 connected with a Clock− signal line in the HDMI signal, B9 pin connected with the power supply VBUS, B8 pin connected with a SDA signal line in the HDMI signal, B7 pin connected with a D− signal line in the USB signal, B6 pin connected with a D+ signal line in the USB signal, B5 connected with a HPD signal line in the HDMI signal, B4 pin connected with the power supply VBUS, B3 pin connected with a Data1− signal line in the HDMI signal line, B2 pin connected with a Data1+ signal line in the HDMI signal, and B1 being grounded (GND).

Referring to Table 1, in the pin definition stated above, the three pairs of high-speed data and one pair of high-speed clock signals are all protected by the power supply and ground for shielding purpose.

TABLE 2

| B1 GND    | A12 GND   |
|-----------|-----------|
| B2 Data2+ | A11 Clock+|
| B3 Data2− | A10 Clock−|

TABLE 2-continued

| | |
|---|---|
| B4 VBUS | A9 VBUS |
| B5 CEC | A8 SDA |
| B6 D+ | A7 D− |
| B7 D− | A6 D+ |
| B8 SCL | A5 HPD |
| B9 VBUS | A4 VBUS |
| B10 Data0− | A3 Data1− |
| B11 Data0+ | A2 Data1+ |
| B12 GND | A1 GND |

Table 2 illustrates a pin definition in the USB Type-C interface in the reverse insertion mode according to an embodiment of the present invention. In the reverse insertion mode of the USB Type-C interface of the portable device, uplink pins of the USB Type-C interface comprises: B1 pin being grounded (GND), B2 pin connected with a Data2+ signal line in the HDMI signal, B3 pin connected with a Data2− signal line in the HDMI signal, B4 pin connected with the power supply VBUS, B5 pin connected with a CEC signal line in the HDMI signal, B6 pin connected with a D+ signal line in the USB signal, B7 pin connected with a D− signal line in the USB signal, B8 pin connected with a SCL signal line in the HDMI signal, B9 pin connected with the power supply VBUS, B10 pin connected with a Data0− signal line in the HDMI signal, B11 pin connected with a Data0+ signal line in the HDMI signal, and B12 pin being grounded (GND); downlink pins of the USB Type-C interface comprises: A12 being grounded (GND), A11 pin connected with a Clock+ signal line in the HDMI signal, A10 pin connected with a Clock− signal line in the HDMI signal, A9 pin connected with the power supply VBUS, A8 pin connected with a SDA signal line in the HDMIS signal, A7 pin connected with a D− signal line in the USB signal, A6 pin connected with a D+ signal line in the USB signal, A5 pin connected with a HPD signal line in the HDMI signal, A4 pin connected with the power supply VBUS, A3 pin connected with a Data1− signal line in the HDMI signal, A2 pin connected with a Data1+ signal line in the HDMI signal, and A1 pin being grounded (GND).

Referring to Table 2, in the definition stated above, the three pairs of high-speed data and one pair of high-speed clock signals are all protected by the power supply and ground also for shielding purpose.

Emphatically, Table 1 and Table 2 are only illustrative definitions of the USB Type-C pin and not sole cases. In other embodiments of the present invention, Table 1 may be regarded as the USB Type-C pin definition in the reverse insertion mode. This is not limited herein.

In addition, the microcontroller unit CPU in the portable device is specifically configured to, upon detecting the USB Type-C interface is inserted positively, transmit to the analog switch a first control signal (e.g., a low-level signal) enabling the analog switch in a first strobe end ON state; upon detecting that the USB Type-C interface is inserted reversely, transmit to the analog switch a second control signal (e.g., a low-level signal) enabling the analog switch in a second strobe end ON state; the analog switch in the portable device is specifically configured to receive the first control signal or second control signal, and control the first strobe end to close according to the first control signal to enable the analog switch in the first strobe end ON state, or control the second strobe end to close according to the second control signal to enable the analog switch in the second strobe end ON state. As such, insertion direction detection and switching direction-shifting control are implemented.

FIG. 4 is a schematic diagram of a switching direction of an analog switch in a circuit in a positive insertion mode according to an embodiment of the present invention. Referring to FIG. 4, the left column of pins denoted by 41 are respectively connected to the HDMI signal output pins of the microcontroller unit, the right column of pins denoted by 42 are respectively connected to corresponding pins of the USB Type-C interface, and a plurality of pairs of analog switches 43, 44 are arranged between the HDMI signal output pins and the corresponding pins of the USB Type-C interface, wherein the analog switches 43 are high-speed switches, and the analog switches 44 are low-speed switches.

Two common terminals of one pair of analog switches 43 among the plurality of pairs shown in FIG. 4 are respectively connected to Data2+/− pins (namely, A2\A3 in the column denoted by 41) of the HDMI signal output pins in the microcontroller unit, the first strobe ends of the pair of analog switches 43 are connected to A2 pin and A3 pin of the USB Type-C interface respectively, and the pair of analog switches 43 are in the first strobe end ON state when the USB Type-C interface of the portable device is in the positive insertion mode.

Two common terminals of one pair of analog switches 43 among the plurality of pairs are respectively connected to Data0+/− pins (namely, A10\A11 in the column denoted by 41) of the HDMI signal output pins in the microcontroller unit, the first strobe ends of the pair of analog switches 43 are connected to A10 pin and A11 pin of the USB Type-C interface respectively, and the pair of analog switches 43 are in the first strobe end ON state when the USB Type-C interface of the portable device is in the positive insertion mode.

Two common terminals of one pair of analog switches 43 among the plurality of pairs are respectively connected to Clock−/+ pins (namely, B10\B11 in the column denoted by 41) of the HDMI signal output pins, the first strobe ends of the pair of analog switches 43 are connected to B10 pin and B11 pin of the USB Type-C interface respectively, and the pair of analog switches 43 are in the first strobe end ON state when the USB Type-C interface of the portable device is in the positive insertion mode.

Two common terminals of one pair of analog switches 43 among the plurality of pairs are respectively connected to Data1+/− pins (namely, B2\B3 in the column denoted by 41) of the HDMI signal output pins, the first strobe ends of the pair of analog switches 43 are connected to B2 pin and B3 pin of the USB Type-C interface respectively, and the pair of analog switches 43 are in the first strobe end ON state when the USB Type-C interface of the portable device is in the positive insertion mode.

A common terminal of one of the analog switches 44 is connected to a CEC pin (namely, A5 in the column denoted by 41) of the HDMI signal output pins, and the first strobe end of the analog switch 44 is connected to A5 pin of the USB Type-C interface; a common terminal of one of the analog switches 44 is connected to a SCL pin (namely, A8 in the column denoted by 41) of the HDMI signal output pins, and the first strobe end of the analog switch 44 is connected to A8 pin of the USB Type-C interface; a common terminal of one of the analog switches 44 is connected to a SDA pin (namely, B8 in the column denoted by 41) of the HDMI signal output pins, and the first strobe end of the analog switch 44 is connected to B8 pin of the USB Type-C interface; a common terminal of one of the analog switches 44 is connected to an HPD pin of the HDMI signal output pins, and the first strobe end of the analog switch 44 is connected to B5 pin of the USB Type-C interface.

When the USB Type-C interface of the portable device is in the positive insertion mode, each of said analog switches 44 is in the first strobe end ON state.

FIG. 5 is a schematic diagram of a switching direction of an analog switch in a circuit in a reverse insertion mode according to an embodiment of the present invention. Referring to FIG. 5, the left column of pins denoted by 51 are respectively connected to the HDMI signal output pins of the microcontroller unit, the right column of pins denoted by 52 are respectively connected to corresponding pins of the USB Type-C interface, and a plurality of pairs of analog switches 53, 54 are arranged between the HDMI signal output pins and the corresponding pins of the USB Type-C interface, wherein the analog switches 53 are high-speed switches, and the analog switches 54 are low-speed switches.

Two common terminals of one pair of analog switches 53 among the plurality of pairs shown in FIG. 5 are respectively connected to Data2+/− pins (namely, A2\A3 in the column denoted by 51) of the HDMI signal output pins in the microcontroller unit, the second strobe ends of the pair of analog switches are connected to B2 pin and B3 pin of the USB Type-C interface respectively, and the pair of analog switches 53 are in the second strobe end ON state when the USB Type-C interface of the portable device is in the reverse insertion mode.

Two common terminals of one pair of analog switches 53 among the plurality of pairs are respectively connected to Data0−/+ pins (namely, A10\A11 in the column denoted by 51) of the HDMI signal output pins in the microcontroller unit, the second strobe ends of the pair of analog switches 53 are connected to B10 pin and B11 pin of the USB Type-C interface respectively, and the pair of analog switches 53 are in the second strobe end ON state when the USB Type-C interface of the portable device is in the reverse insertion mode.

Two common terminals of one pair of analog switches 53 among the plurality of pairs are respectively connected to Clock−/+ pins (namely, B10\B11 in the column denoted by 51) of the HDMI signal output pins, the second strobe ends of the pair of analog switches 53 are connected to A10 pin and A11 pin of the USB Type-C interface respectively, and the pair of analog switches 53 are in the second strobe end ON state when the USB Type-C interface of the portable device is in the reverse insertion mode.

Two common terminals of one pair of analog switches 53 among the plurality of pairs are respectively connected to Data1+/− pins (namely, B2\B3 in the column denoted by 51) of the HDMI signal output pins, the second strobe ends of the pair of analog switches 53 are connected to A2 pin and A3 pin of the USB Type-C interface respectively, and the pair of analog switches 53 are in the second strobe end ON state when the USB Type-C interface of the portable device is in the reverse insertion mode.

A common terminal of one of the analog switches 54 is connected to a HPD pin (namely, A5 in the column denoted by 51) of the HDMI signal output pins, and the second strobe end of the analog switch 54 is connected to B5 pin of the USB Type-C interface; a common terminal of one of the analog switches 54 is connected to a SDA pin (namely, A8 in the column denoted by 51) of the HDMI signal output pins, and the second strobe end of the analog switch 54 is connected to B8 pin of the USB Type-C interface; a common terminal of one of the analog switches 54 is connected to a SCL pin (namely, B8 in the column denoted by 51) of the HDMI signal output pins, and the second strobe end of the analog switch 54 is connected to A8 pin of the USB Type-C interface; a common terminal of one of the analog switches 54 is connected to an CEC pin (namely, B5 in the column denoted by 51) of the HDMI signal output pins, and the second strobe end of the analog switch 54 is connected to A5 pin of the USB Type-C interface.

When the USB Type-C interface of the portable device is in the reverse insertion mode, each of said analog switches 54 is in the second strobe end ON state.

Emphatically, the analog switches in the present embodiments may employ single-pole double-throw switches, and a plurality of single-pole double-throw switches are arranged on the same switch chip.

In addition, as schematically illustrated in FIG. 4 and FIG. 5, one pair of analog switches are arranged between each pair of HDMI high-speed differential signal lines and corresponding pins of the USB Type-C interface, namely, the circuit totally includes four pairs of high-speed analog switches and four low-speed analog switches. It may be appreciated that other embodiments of the present invention may employ a manner in which one of the analog switches is arranged between each HDMI signal line of a pair of differential signal lines and a corresponding pin of the USB Type-C interface. As such, the circuit totally includes eight high-speed analog switches and four low-speed analog switches.

In practical use, the direction of each analog switch may be considered in the first strobe end ON state by default, namely, the analog switch is considered in the positive insertion mode by default. As such, only when the user inserts in the USB Type-C interface reversely is the analog switch controlled to shift the direction so as to reduce switch-shifting operations and response time, and improve the data transmission efficiency.

As known from the above, in the present embodiment of the present invention, a signal name of HDMI is used to replace an original signal name on the USB Type-C so that the HDMI signal and USB signal share the high-speed USB Type-C signal line for data transmission. Functionally, the standard USB Type-C interface originally only enabling USB 3.0 data transmission is replaced with one HDMI interface plus one USB 2.0 interface.

Embodiment 3

Figure 6:
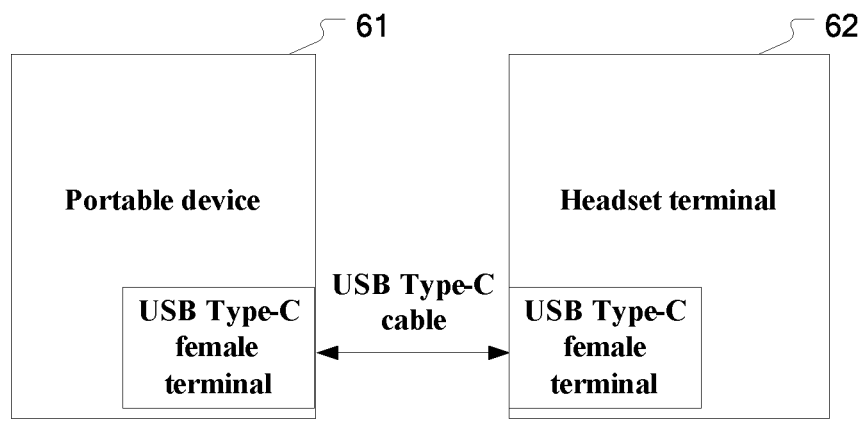
FIG. 6 is a schematic diagram of an application scenario of a portable device according to an embodiment of the present invention.

FIG. 6 is a schematic diagram of an application scenario of a portable device according to an embodiment of the present invention. An operation procedure of the portable device according to the embodiment of the present invention will be described in conjunction with a specific application scenario.

Referring to FIG. 6, a portable device 61 and a headset terminal 62 perform data interaction. Specifically, when the user wants to use the headset terminal to play video or play games, he first activates the microcontroller unit (Central Processing Unit, CPU) of the portable device 61, the microcontroller unit is used to decode the video data or games data, then the data is delivered to an HDMI controller in the CPU, and the HDMI signal is output through the USB Type-C interface. When a USB Type-C cable (a USB Type-C male terminal is arranged at both ends of the cable) is inserted in the USB Type-C interface of the headset terminal 62, the CPU attempts to communicate with the headset terminal 62 through a IIC bus (namely, SCL and SDA signal lines in the USB Type-C interface) in the USB Type-C interface; if they communicate successfully, the HDMI data of the portable device 61 is normally transmitted to the headset terminal 62, and then displayed by the headset terminal 62. If they fail to communicate, the CPU controls to shift the direction of the analog switch in the circuit, and then attempts to communicate with the headset terminal 62; if they communicate successfully, the HDMI data is normally transmitted to the headset terminal 62; if they still fail to communicate, the HDMI output is closed.

Embodiment 4

Figure 7:
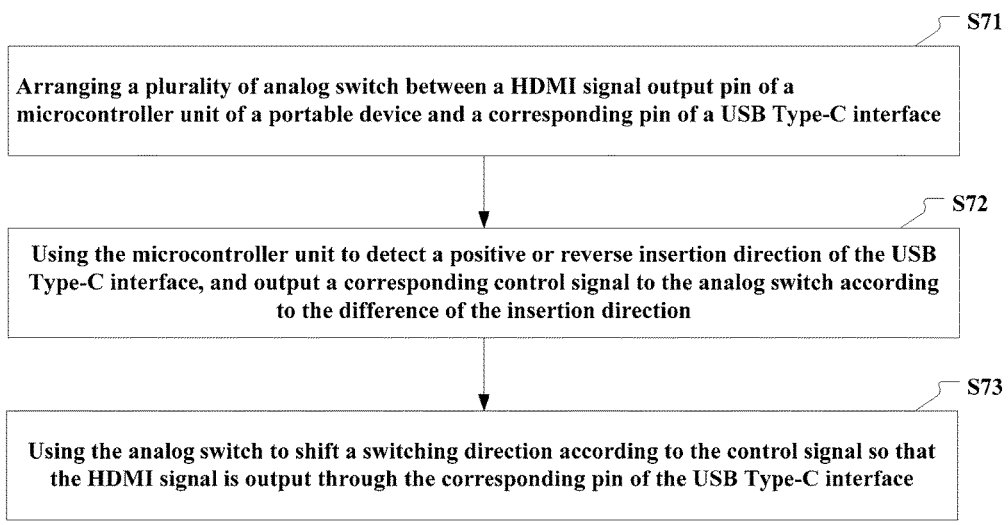
FIG. 7 is a flow chart of a method of controlling HDMI signal output in a portable device according to an embodiment of the present invention.

FIG. 7 is a flow chart of a method of controlling HDMI signal output in a portable device according to an embodiment of the present invention. As shown in FIG. 7, the method comprises:

Step S71: arranging a plurality of analog switches between a HDMI signal output pin of a microcontroller unit of a portable device and a corresponding pin of a USB Type-C interface;

Step S72: using the microcontroller unit to detect positive or reverse insertion direction of the USB Type-C interface, and outputting a corresponding control signal to the analog switch according to the difference of the insertion direction;

Step S73: using the analog switch to shift a switching direction according to the control signal so that the HDMI signal is output through the corresponding pin of the USB Type-C interface.

In an embodiment of the present invention, step S71 specifically comprises:

selecting pins of four pairs of differential signal lines Data2+/−, Clock+/−, Data1+/−, Data0+/−, and CEC pin, HPD pin, SDA pin and SCL pin in the HDMI signal output pins;

selecting corresponding pins of the USB Type-C interface: pins of four pairs of differential signal lines A2A3, A10A11, B2B3, B10B11, and A5 pin, A8 pin, B8 pin and B5 pin;

arranging a common terminal of an analog switch to be connected to a Data2+ pin of the HDMI signal output pins, arranging a first strobe end of the analog switch to be connected to A2 pin of the USB Type-C interface, and arranging a second strobe end of the analog switch to be connected to B2 pin of the USB Type-C interface;

arranging a common terminal of an analog switch to be connected to a Data2− pin of the HDMI signal output pins, arranging a first strobe end of the analog switch to be connected to A3 pin of the USB Type-C interface, and arranging a second strobe end of the analog switch to be connected to B3 pin of the USB Type-C interface;

arranging a common terminal of an analog switch to be connected to a Data0− pin of the HDMI signal output pins, arranging a first strobe end of the analog switch to be connected to A10 pin of the USB Type-C interface, and arranging a second strobe end of the analog switch to be connected to B10 pin of the USB Type-C interface;

arranging a common terminal of an analog switch to be connected to a Data0+ pin of the HDMI signal output pins, arranging a first strobe end of the analog switch to be connected to A11 pin of the USB Type-C interface, and arranging a second strobe end of the analog switch to be connected to B11 pin of the USB Type-C interface;

arranging a common terminal of an analog switch to be connected to a Clock− pin of the HDMI signal output pins, arranging a first strobe end of the analog switch to be connected to B10 pin of the USB Type-C interface, and arranging a second strobe end of the analog switch to be connected to A10 pin of the USB Type-C interface;

arranging a common terminal of an analog switch to be connected to a Clock+ pin of the HDMI signal output pins, arranging a first strobe end of the analog switch to be connected to B11 pin of the USB Type-C interface, and arranging a second strobe end of the analog switch to be connected to A11 pin of the USB Type-C interface;

arranging a common terminal of an analog switch to be connected to a Data1+ pin of the HDMI signal output pins, arranging a first strobe end of the analog switch to be connected to B2 pin of the USB Type-C interface, and arranging a second strobe end of the analog switch to be connected to A2 pin of the USB Type-C interface;

arranging a common terminal of an analog switch to be connected to a Data1− pin of the HDMI signal output pins, arranging a first strobe end of the analog switch to be connected to B3 pin of the USB Type-C interface, and arranging a second strobe end of the analog switch to be connected to A3 pin of the USB Type-C interface;

arranging a common terminal of an analog switch to be connected to a CEC pin of the HDMI signal output pins, arranging a first strobe end of the analog switch to be connected to A5 pin of the USB Type-C interface, and arranging a second strobe end of the analog switch to be connected to B5 pin of the USB Type-C interface;

arranging a common terminal of an analog switch to be connected to a SCL pin of the HDMI signal output pins, arranging a first strobe end of the analog switch to be connected to A8 pin of the USB Type-C interface, and arranging a second strobe end of the analog switch to be connected to B8 pin of the USB Type-C interface;

arranging a common terminal of an analog switch to be connected to a SDA pin of the HDMI signal output pins, arranging a first strobe end of the analog switch to be connected to B8 pin of the USB Type-C interface, and arranging a second strobe end of the analog switch to be connected to A8 pin of the USB Type-C interface;

arranging a common terminal of an analog switch to be connected to a HPD pin of the HDMI signal output pins, arranging a first strobe end of the analog switch to be connected to B5 pin of the USB Type-C interface, and arranging a second strobe end of the analog switch to be connected to A5 pin of the USB Type-C interface.

In an embodiment of the present invention, step S72 specifically comprises:

when the microcontroller unit detects that the USB Type-C interface is inserted positively, transmitting to the analog switch a first control signal enabling the analog switch in a first strobe end ON state; upon detecting that the USB Type-C interface is inserted reversely, transmitting to the analog switch a second control signal enabling the analog switch in a second strobe end ON state;

The using the analog switch to shift a switching direction according to the control signal so that the HDMI signal is output through the corresponding pin of the USB Type-C interface comprises:

receiving the first control signal or second control signal, and controlling the first strobe end to close according to the first control signal to enable the analog switch in the first strobe end ON state, or controlling the second strobe end to close according to the second control signal to enable the analog switch in the second strobe end ON state.

In an embodiment of the present invention, the method shown in FIG. 7 further comprises: setting each analog switch in the first strobe end ON state by default.

In an embodiment of the present invention, the analog switches are single-pole double-throw switches, and the plurality of single-pole double-throw switches are arranged on the same switch chip.

Noticeably, the HDMI signal in the method of controlling HDMI signal output in the present embodiment is the HDMI signal to be output in the portable device in the above embodiment. Therefore, reference may be made to the above-mentioned related depictions of the portable device for steps for implementing the method of controlling the HDMI signal output in the present embodiment, and no detailed depictions will be provided here.

To conclude, the technical solutions of embodiments of the present invention have the following advantages:

1) Partial pins of the USB Type-C interface of the portable device are used to transmit the HDMI signal so that the HDMI signal can be output correctly in the case of either the positive insertion or reverse insertion of the USB Type-C interface.

2) Among pins of the USB Type-C interface, a USB signal transmission channel is reserved to transmit USB data, thereby implementing enabling of HDMI data transmission and USB data transmission. As such, the user only needs to execute the interface insertion operation once during use so that the user's time is saved, the user's operation is facilitated, and the user experience is optimized.

3) Only one USB Type-C interface needs to be arranged in the portable device to perform three functions, namely, USB data transmission, quick charging and HDMI audio and video signal transmission. As compared with a device having both the HDMI interface and USB interface in the prior art, the device according to the present invention omits the HDMI interface, exhibits a more compact structure, saves overall space of the device and improves market competitive power of the portable device.

What are stated above are only preferred embodiments of the present invention and not used to limit the protection scope of the present invention. Any modifications, equivalent substitutions and improvement within the spirit and principle of the present invention are all included in the protection scope of the present invention.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A portable device, wherein the portable device comprises:
    a microcontroller unit;
    a USB Type-C interface; and
    a plurality of analog switches,
    each of the analog switches is arranged between a HDMI signal output pin of the microcontroller unit and a corresponding pin of the USB Type-C interface;
    the microcontroller unit is configured to detect a positive or reverse insertion direction of the USB Type-C interface, and output a corresponding control signal to the analog switch according to the difference of the insertion direction, and
    the analog switch is configured to shift a switching direction according to the control signal so that the HDMI signal is output through a corresponding pin of the USB Type-C interface;
    wherein the HDMI signal output pins comprise: pins of four pairs of differential signal lines Data2+/−, Clock+/−, Data1+/−, Data0+/−, and CEC pin, HPD pin, SDA pin and SCL pin;
    the corresponding pins of the USB Type-C interface comprise: pins of four pairs of differential signal lines A2A3, A10A11, B2B3, B10B11, and A5 pin, A8 pin, B8 pin and B5 pin;
    a common terminal of one of said analog switches is connected to a Data2+ pin of the HDMI signal output pins, a first strobe end of the analog switch is connected to A2 pin of the USB Type-C interface, and a second strobe end of the analog switch is connected to B2 pin of the USB Type-C interface;
    a common terminal of one of said analog switches is connected to a Data2− pin of the HDMI signal output pins, a first strobe end of the analog switch is connected to A3 pin of the USB Type-C interface, and a second strobe end of the analog switch is connected to B3 pin of the USB Type-C interface;
    a common terminal of one of said analog switches is connected to a Data0− pin of the HDMI signal output pins, a first strobe end of the analog switch is connected to A10 pin of the USB Type-C interface, and a second strobe end of the analog switch is connected to B10 pin of the USB Type-C interface;
    a common terminal of one of said analog switches is connected to a Data0+ pin of the HDMI signal output pins, a first strobe end of the analog switch is connected to A11 pin of the USB Type-C interface, and a second strobe end of the analog switch is connected to B11 pin of the USB Type-C interface;
    a common terminal of one of said analog switches is connected to a Clock− pin of the HDMI signal output pins, a first strobe end of the analog switch is connected to B10 pin of the USB Type-C interface, and a second strobe end of the analog switch is connected to A10 pin of the USB Type-C interface;
    a common terminal of one of said analog switches is connected to a Clock+ pin of the HDMI signal output pins, a first strobe end of the analog switch is connected to B11 pin of the USB Type-C interface, and a second strobe end of the analog switch is connected to A11 pin of the USB Type-C interface;
    a common terminal of one of said analog switches is connected to a Data1+ pin of the HDMI signal output pins, a first strobe end of the analog switch is connected to B2 pin of the USB Type-C interface, and a second strobe end of the analog switch is connected to A2 pin of the USB Type-C interface;
    a common terminal of one of said analog switches is connected to a Data1− pin of the HDMI signal output pins, a first strobe end of the analog switch is connected to B3 pin of the USB Type-C interface, and a second strobe end of the analog switch is connected to A3 pin of the USB Type-C interface;
    a common terminal of one of said analog switches is connected to a CEC pin of the HDMI signal output pins, a first strobe end of the analog switch is connected to A5 pin of the USB Type-C interface, and a second strobe end of the analog switch is connected to B5 pin of the USB Type-C interface;

a common terminal of one of said analog switches is connected to a SCL pin of the HDMI signal output pins, a first strobe end of the analog switch is connected to A8 pin of the USB Type-C interface, and a second strobe end of the analog switch is connected to B8 pin of the USB Type-C interface;

a common terminal of one of said analog switches is connected to a SDA pin of the HDMI signal output pins, a first strobe end of the analog switch is connected to B8 pin of the USB Type-C interface, and a second strobe end of the analog switch is connected to A8 pin of the USB Type-C interface;

a common terminal of one of said analog switches is connected to a HPD pin of the HDMI signal output pins, a first strobe end of the analog switch is connected to B5 pin of the USB Type-C interface, and a second strobe end of the analog switch is connected to A5 pin of the USB Type-C interface.

2. The portable device according to claim 1, wherein:
the microcontroller unit is specifically configured to, upon detecting that the USB Type-C interface is inserted positively, transmit to the analog switch a first control signal enabling the analog switch in a first strobe end ON state; upon detecting that the USB Type-C interface is inserted reversely, transmit to the analog switch a second control signal enabling the analog switch in a second strobe end ON state;

the analog switch is specifically configured to receive the first control signal or the second control signal, and control the first strobe end to close according to the first control signal to enable the analog switch in the first strobe end ON state, or control the second strobe end to close according to the second control signal to enable the analog switch in the second strobe end ON state.

3. The portable device according to claim 2, wherein each of said analog switches is in the first strobe end ON state by default.

4. The portable device according to claim 3, wherein the analog switches are single-pole double-throw switches, and the plurality of single-pole double-throw switches are arranged on the same switch chip.

5. A method of controlling HDMI signal output in a portable device, the method comprising:
arranging a plurality of analog switches between a HDMI signal output pin of a microcontroller unit of a portable device and a corresponding pin of a USB Type-C interface;

using the microcontroller unit to detect a positive or reverse insertion direction of the USB Type-C interface, and outputting a corresponding control signal to the analog switch according to the difference of the insertion direction; and using the analog switch to shift a switching direction according to the control signal so that the HDMI signal is output through the corresponding pin of the USB Type-C interface;

wherein the arranging a plurality of analog switches between a HDMI signal output pin of a microcontroller unit of a portable device and a corresponding pin of a USB Type-C interface comprises:

selecting pins of four pairs of differential signal lines Data2+/−, Clock+/−, Data1+/−, Data0+/−, and CEC pin, HPD pin, SDA pin and SCL pin in HDMI signal output pins;

selecting corresponding pins of the USB Type-C interface: pins of four pairs of differential signal lines A2A3, A10A11, B2B3, B10B11, and A5 pin, A8 pin, B8 pin and B5 pin;

arranging a common terminal of one of said analog switches to be connected to a Data2+ pin of the HDMI signal output pins, arranging a first strobe end of the analog switch to be connected to A2 pin of the USB Type-C interface, and arranging a second strobe end of the analog switch to be connected to B2 pin of the USB Type-C interface;

arranging a common terminal of one of said analog switches to be connected to a Data2− pin of the HDMI signal output pins, arranging a first strobe end of the analog switch to be connected to A3 pin of the USB Type-C interface, and arranging a second strobe end of the analog switch to be connected to B3 pin of the USB Type-C interface;

arranging a common terminal of one of said analog switches to be connected to a Data0− pin of the HDMI signal output pins, arranging a first strobe end of the analog switch to be connected to A10 pin of the USB Type-C interface, and arranging a second strobe end of the analog switch to be connected to B10 pin of the USB Type-C interface;

arranging a common terminal of one of said analog switches to be connected to a Data0+ pin of the HDMI signal output pins, arranging a first strobe end of the analog switch to be connected to A11 pin of the USB Type-C interface, and arranging a second strobe end of the analog switch to be connected to B11 pin of the USB Type-C interface;

arranging a common terminal of one of said analog switches to be connected to a Clock− pin of the HDMI signal output pins, arranging a first strobe end of the analog switch to be connected to B10 pin of the USB Type-C interface, and arranging a second strobe end of the analog switch to be connected to A10 pin of the USB Type-C interface;

arranging a common terminal of one of said analog switches to be connected to a Clock+ pin of the HDMI signal output pins, arranging a first strobe end of the analog switch to be connected to B11 pin of the USB Type-C interface, and arranging a second strobe end of the analog switch to be connected to A11 pin of the USB Type-C interface;

arranging a common terminal of one of said analog switches to be connected to a Data1+ pin of the HDMI signal output pins, arranging a first strobe end of the analog switch to be connected to B2 pin of the USB Type-C interface, and arranging a second strobe end of the analog switch to be connected to A2 pin of the USB Type-C interface;

arranging a common terminal of one of said analog switches to be connected to a Data1− pin of the HDMI signal output pins, arranging a first strobe end of the analog switch to be connected to B3 pin of the USB Type-C interface, and arranging a second strobe end of the analog switch to be connected to A3 pin of the USB Type-C interface;

arranging a common terminal of one of said analog switches to be connected to a CEC pin of the HDMI signal output pins, arranging a first strobe end of the analog switch to be connected to A5 pin of the USB Type-C interface, and arranging a second strobe end of the analog switch to be connected to B5 pin of the USB Type-C interface;

arranging a common terminal of one of said analog switches to be connected to a SCL pin of the HDMI signal output pins, arranging a first strobe end of the analog switch to be connected to A8 pin of the USB Type-C interface, and arranging a second strobe end of the analog switch to be connected to B8 pin of the USB Type-C interface;

arranging a common terminal of one of said analog switches to be connected to a SDA pin of the HDMI signal output pins, arranging a first strobe end of the analog switch to be connected to B8 pin of the USB Type-C interface, and arranging a second strobe end of the analog switch to be connected to A8 pin of the USB Type-C interface;

arranging a common terminal of one of said analog switches to be connected to a HPD pin of the HDMI signal output pins, arranging a first strobe end of the analog switch to be connected to B5 pin of the USB Type-C interface, and arranging a second strobe end of the analog switch to be connected to A5 pin of the USB Type-C interface.

6. The method according to claim 5, wherein the using the microcontroller unit to detect a positive or reverse insertion direction of the USB Type-C interface, and outputting a corresponding control signal to the analog switch according to the difference of the insertion direction comprises:

when the microcontroller unit detects that the USB Type-C interface is inserted positively, transmitting to the analog switch a first control signal enabling the analog switch in a first strobe end ON state; upon detecting that the USB Type-C interface is inserted reversely, transmitting to the analog switch a second control signal enabling the analog switch in a second strobe end ON state;

the using the analog switch to shift a switching direction according to the control signal so that the HDMI signal is output through the corresponding pin of the USB Type-C interface comprises:

receiving the first control signal or second control signal, and controlling the first strobe end to close according to the first control signal to enable the analog switch in the first strobe end ON state, or controlling the second strobe end to close according to the second control signal to enable the analog switch in the second strobe end ON state.

7. The method according to claim 6, wherein the method further comprises: setting each of said analog switches in the first strobe end ON state by default.

8. The method according to claim 7, wherein the analog switches are single-pole double-throw switches, and the plurality of single-pole double-throw switches are arranged on the same switch chip.

* * * * *